United States Patent
Schoebrechts et al.

(10) Patent No.: US 9,906,075 B2
(45) Date of Patent: Feb. 27, 2018

(54) UNINTERRUPTIBLE POWER SUPPLY SYSTEM

(71) Applicant: KS RESEARCH SA

(72) Inventors: Jacques Jean Schoebrechts, Soumagne (BE); Stéphane Ernest Pire, Liège (BE)

(73) Assignee: KS RESEARCH SA (BE)

( * ) Notice: Subject to any disclaimer, the term of this patent is extended or adjusted under 35 U.S.C. 154(b) by 225 days.

(21) Appl. No.: 14/703,882

(22) Filed: May 4, 2015

(65) Prior Publication Data
US 2015/0333570 A1  Nov. 19, 2015

(51) Int. Cl.
*H02J 9/00* (2006.01)
*H02J 9/06* (2006.01)
*H02K 7/02* (2006.01)

(52) U.S. Cl.
CPC .............. *H02J 9/066* (2013.01); *H02K 7/025* (2013.01); *Y02E 60/16* (2013.01); *Y10T 307/636* (2015.04)

(58) Field of Classification Search
CPC ............................. H02J 9/066; Y10T 307/636
USPC .......................................................... 307/68
See application file for complete search history.

(56) References Cited

U.S. PATENT DOCUMENTS

| 4,035,659 | A | 7/1977 | Jeppson | |
|---|---|---|---|---|
| 6,184,593 | B1 | 2/2001 | Jungreis | |
| 6,320,279 | B1 | 11/2001 | Lopez Jimenez | |
| 6,611,068 | B2 | 8/2003 | Cratty | |
| 6,614,132 | B2 | 9/2003 | Hockney et al. | |
| 7,358,620 | B2 | 4/2008 | Melfi | |
| 2002/0101119 | A1* | 8/2002 | Eisenhaure | H02J 9/08 307/64 |
| 2003/0137196 | A1 | 7/2003 | Liran | |
| 2008/0034256 | A1* | 2/2008 | Mosman | H02J 9/06 714/43 |
| 2012/0112547 | A1* | 5/2012 | Ghosh | H02J 9/062 307/66 |

FOREIGN PATENT DOCUMENTS

| DE | 19712814 A1 * | 5/1998 | ............. H02K 7/025 |
|---|---|---|---|
| EP | 1533884 A1 | 5/2005 | |

OTHER PUBLICATIONS

DE19712814A1, Rotor cooling for flywheel energy storage device, English translation, pp. 1-5 and figures 1-2.*

* cited by examiner

*Primary Examiner* — Alfonso Perez Borroto
(74) *Attorney, Agent, or Firm* — Ash Tankha; Lipton, Weinberger & Husick

(57) ABSTRACT

A dynamic uninterruptible power supply system including a synchronous machine with two shaft ends inserted between two kinetic energy accumulators for doubling the unit capacity is provided.

8 Claims, 7 Drawing Sheets

UNINTERRUPTIBLE POWER SUPPLY SYSTEM

CROSS-REFERENCE TO RELATED APPLICATIONS

This application claims priority to and the benefit of the non-provisional patent application No. BE 2014/0366 titled "Uninterruptible Power Supply System", filed in the Belgian Office for Intellectual Property (OPRI) on May 16, 2014. The specification of the above referenced patent application is incorporated herein by reference in its entirety.

BACKGROUND

The invention relates to an uninterruptible power supply system for use in high-power systems for organisations such as hospitals or large administrations, databanks, high technology industries, etc., which cannot suffer any disturbance to their electrical network without unacceptable damage.

In order to guarantee an uninterrupted power supply, "dynamic uninterruptible power supply" (DUPS) systems are frequently used. The DUPS systems generally comprise at least two essential components: a kinetic energy accumulator and a synchronous machine, where all the components are assembled on a common frame.

One such minimal configuration, for example, is that described in European Patent EP 1.533.884. This configuration makes it possible to provide a power supply generally in excess of 10 seconds, equivalent to the time required to start up an electricity generator unit which is connected electrically via a coupling device called a source inverter, to ensure continuity of supply.

In some cases, a diesel motor can be associated by providing a second shaft end to the kinetic energy accumulator or to an alternator and a temporary coupling system, for example, a clutch. In this latter configuration, the diesel motor is intended to pick up the load before the available energy in the kinetic energy accumulator has fully expended.

The systems described above must guarantee a very high degree of reliability, as they are employed for users who cannot suffer any disturbance to their electrical network.

The market for this type of dynamic uninterruptible power supply is growing rapidly due to the increased number and size of data centres and high technology industries. The instability of big electrical networks, caused by the use of alternative energies, is engendering a high demand for high-power systems for increasing the reliability for hospitals, large administrations, data centres, and high technology industries.

There is therefore a need for DUPS systems of increasingly large unit capacities, that allow the number of machines required to be reduced, thereby rendering installations simpler and significantly more economic. The DUPS systems described above are, however, limited in terms of capacity and autonomy by the kinetic energy accumulator. Kinetic energy accumulators are based on a concept whereby substantial large-diameter masses are in rotation at high speeds.

Because of this, the mechanical stresses induced in the parts rotating at high speeds limit both the diameter and the speed of rotation, in accordance with the law governing centrifugal forces $f = m \cdot w^2 \cdot r$. Another element to be considered is the total mass of the rotating part, which accumulates energy according to the law $E = \frac{1}{2} J \cdot W^2$. This mass has to be supported by bearings and therefore the limits of the capacities of the bearings supplied by the main manufacturers in terms of load and service life are quickly reached.

In contrast, synchronous machines that are commonly and commercially available can easily achieve higher capacities than those of kinetic energy accumulators.

SUMMARY OF THE INVENTION

The dynamic uninterruptible power supply (DUPS) system disclosed herein overcomes the aforementioned disadvantages by means of an arrangement that allows the unit capacity of the DUPS system with a kinetic energy accumulator to be doubled.

The DUPS system disclosed herein comprises a synchronous machine with two shaft ends inserted between two kinetic energy accumulators for doubling the capacity while retaining only one DUPS system, as shafts of the machines are rendered integral by means of couplings.

In the dynamic uninterruptible power supply system disclosed herein, an alternator is designed for twice the capacity and thus delivers a machine with a unit capacity that is double the capacity of the traditional machine described above.

In an embodiment of the dynamic uninterruptible power supply (DUPS) system, casings of the machine and the kinetic energy accumulators are bolted together, such that they form a single entity mounted on a common frame to form a non-deformable whole structure. The advantage of this rigid assembly on a frame is that the whole structure thus formed is not affected by irregularities in the floor on which the whole structure stands.

In an embodiment, the synchronous machine is equipped with an autonomous connection system comprising an inductor and two circuit breakers, where the first circuit breaker is used to interrupt a connection between the synchronous machine and an electrical network, and the second circuit breaker is used to maintain a connection between the synchronous machine and a critical load which has to be supplied without interruption. A third circuit breaker or a switch commonly called a "by-pass" is generally installed between the input and output of the DUPS system to allow the critical load to be supplied in the event of an outage of the DUPS system. In addition to the power components described above, the autonomous connection system also incorporates all command, control, communication and safety components.

The advantage of such an autonomous connection system is that the synchronous machine can automatically uncouple the electrical network as soon as the electrical network is no longer supplying electrical current, whilst maintaining the critical load supplied by the synchronous machine; the critical load then draws its energy from the kinetic energy accumulators. It is important, however, to ensure good power distribution between both the kinetic energy accumulators when they are in operation, to avoid a premature discharge of one or the other kinetic energy accumulator. To this end, the autonomous connection system exchanges and corrects, in real time, the speed of the rotating masses of the kinetic energy accumulators such that they remain identical.

In an embodiment, the DUPS system is equipped with a source inverter which can switch between the electrical network and an alternative source, for example, a diesel motor generator which can provide a long lasting power supply in the event that the electrical network is not restored sufficiently quickly.

Dynamic uninterruptible power supply systems comprising synchronous machines with two shaft ends inserted between two kinetic energy accumulators can be connected in parallel to achieve greater capacities. The advantage of this type of connectivity is that the power can be increased without increasing either the masses or the diameters of the rotating masses of the kinetic energy accumulators.

It is also possible to operate one or more dynamic uninterruptible power supply systems of the type described at medium voltage by means of one or more transformers inserted between the synchronous machine(s) and/or its autonomous connection systems.

In the DUPS system disclosed herein, the advantage is that the number of transformers and connection systems is halved because of the doubling of the capacity of the DUPS system.

BRIEF DESCRIPTION OF THE DRAWINGS

For greater clarity, some illustrative and non-restrictive examples of embodiments of a dynamic uninterruptible power supply (DUPS) system according to the invention are described below, reference being made to the appended drawings, wherein.

DETAILED DESCRIPTION OF THE INVENTION

Figure 1:
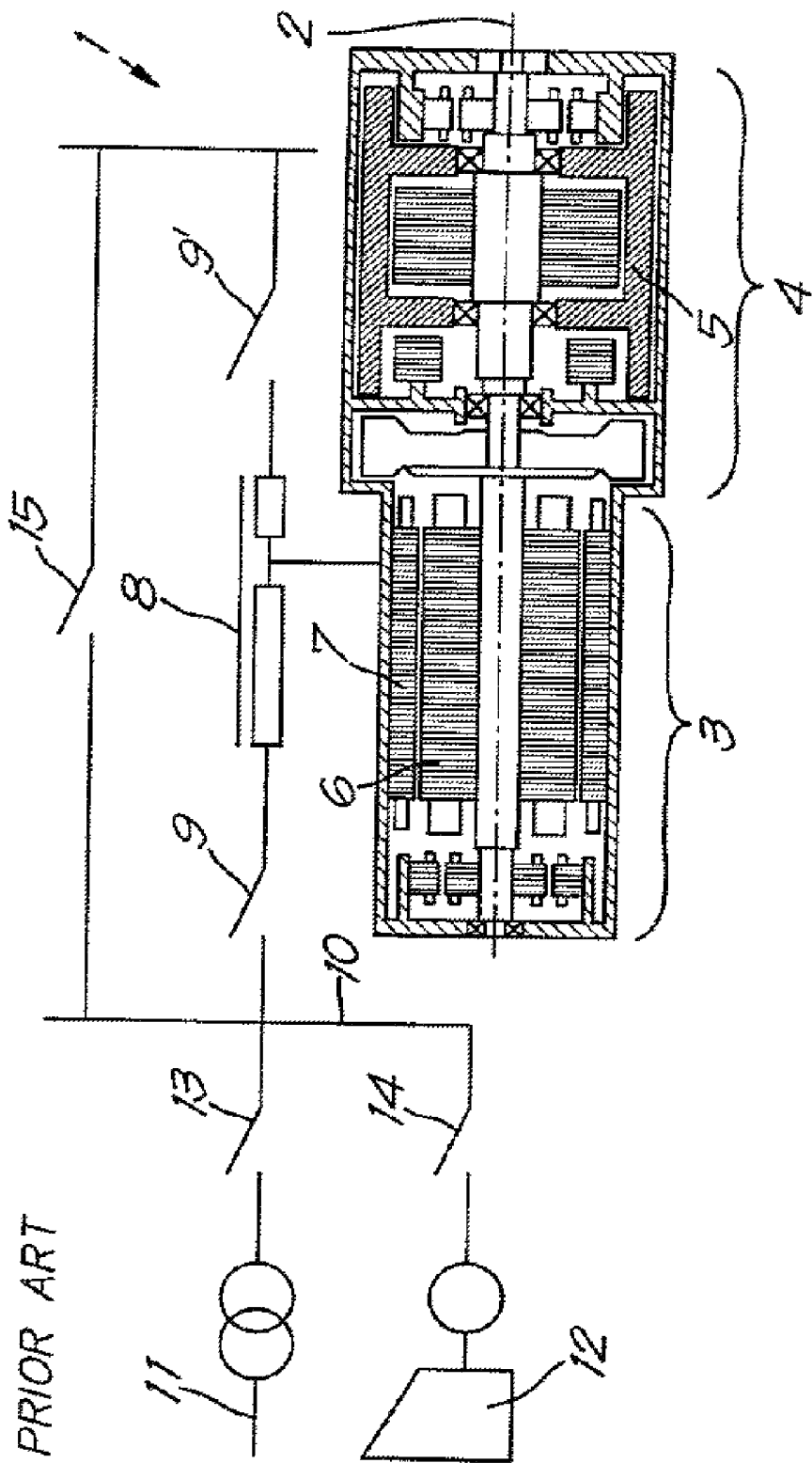
FIG. 1 (prior art) represents a schematic sectional view along the axis of rotation of a dynamic uninterruptible power supply (DUPS) system according to the state of the art.

In FIG. 1 (prior art), a schematic sectional view is represented along the longitudinal axis of a dynamic uninterruptible power supply (DUPS) system 1 according to the state of the art, the longitudinal axis also being the common axis of rotation 2 which links a synchronous machine 3 to a kinetic energy accumulator 4, provided with a rotating mass 5. The synchronous machine 3 comprising a rotor 6 and a stator 7 is connected to an inductor 8. The inductor 8 is connected to circuit breakers 9, 9', which act to interrupt a connection of the synchronous machine 3 to an electrical source and to a critical load. A source inverter 10 selects the electrical source from between the electrical network 11 and an alternative source, for example, an electricity generator unit 12 such as a diesel motor generator, using two circuit breakers 13, 14. A circuit breaker 15 provides a means of connecting the electrical network 11 directly to the critical load in the event of non-availability of the DUPS system 1.

Figure 2:
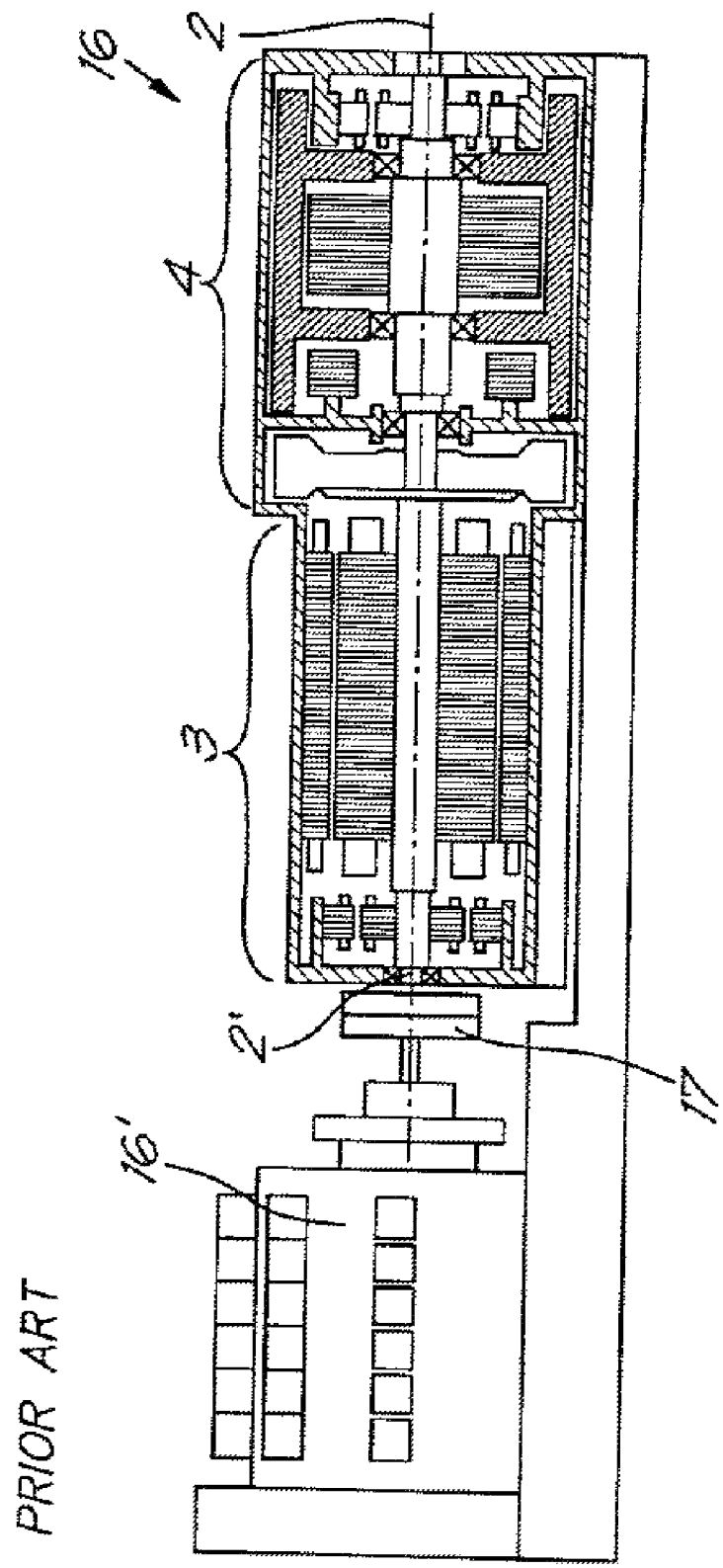
FIG. 2 (prior art) represents a sectional view along the longitudinal axis of rotation of a power supply system with a diesel motor coupled to a synchronous machine according to the state of the art.

FIG. 2 (prior art) shows a longitudinal sectional view of a dynamic uninterruptible power supply (DUPS) system 16 according to the state of the art, equipped with a diesel motor 16'. The diesel motor 16' is an alternative power source coupled temporarily to the synchronous machine 3 by means of, for example, a clutch 17 at a second shaft 2'.

Figure 3:
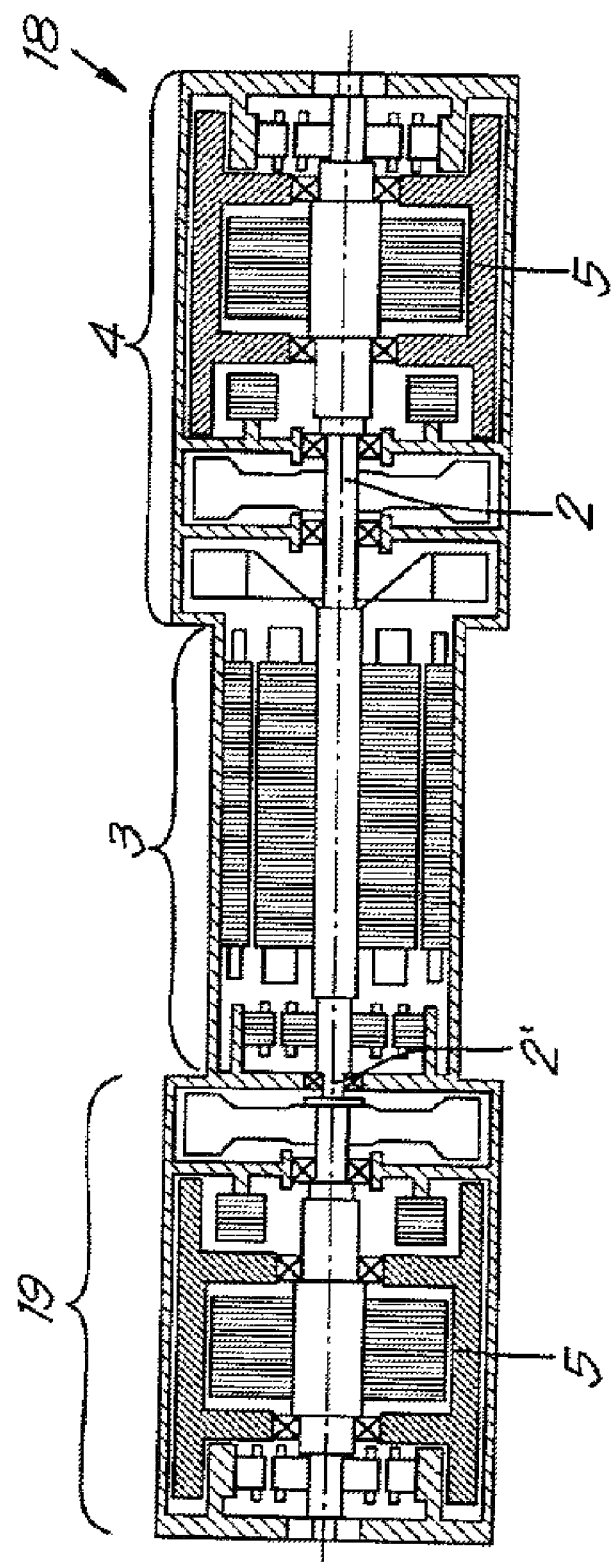
FIG. 3 represents a sectional view along the longitudinal axis of rotation of a dynamic uninterruptible power supply system according to the invention.

FIG. 3 shows a longitudinal sectional view of a dynamic uninterruptible power supply (DUPS) system 18 according to the invention. The DUPS system 18 comprises a synchronous machine 3 whose rotational axis 2-2' is linked to a first kinetic energy accumulator 4 and to a second kinetic energy accumulator 19, both equipped with a rotating mass 5.

Figure 4:
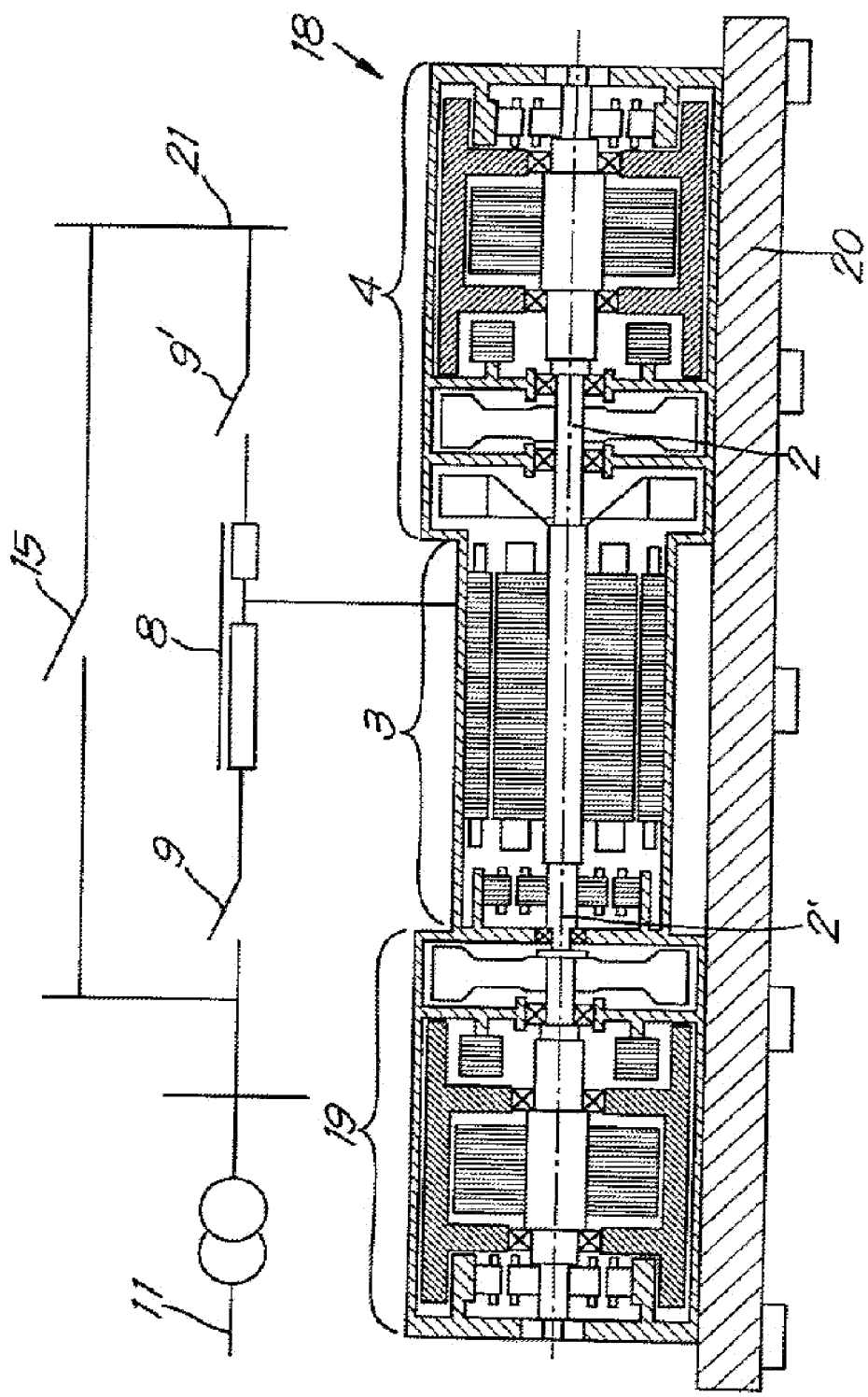
FIG. 4 represents an embodiment where the dynamic uninterruptible power supply system shown in FIG. 3 is fixed to a frame and connected to an electrical network and to a load by means of an autonomous connection system.

FIG. 4 shows an embodiment where the dynamic uninterruptible power supply (DUPS) system 18 shown in FIG. 3 is fixed to a frame 20 and connected to an electrical network 11 and to a load 21 by means of an autonomous connection system 8, 9, 9'. The DUPS system 18 is connected via an inductor 8 coupled to a circuit breaker 9. The circuit breaker 9 is configured to interrupt a connection of the synchronous machine 3 to the electrical network 11. The DUPS system 18 is also connected to a second circuit breaker 9' which supplies the critical load 21 either via the electrical network 11 or via the synchronous machine 3 of the DUPS system 18. The whole assembly is also equipped with a circuit breaker or switch 15 which makes it possible to continue to supply the critical loads via the electrical network 11 when the DUPS system 18 is not available.

Figure 5:
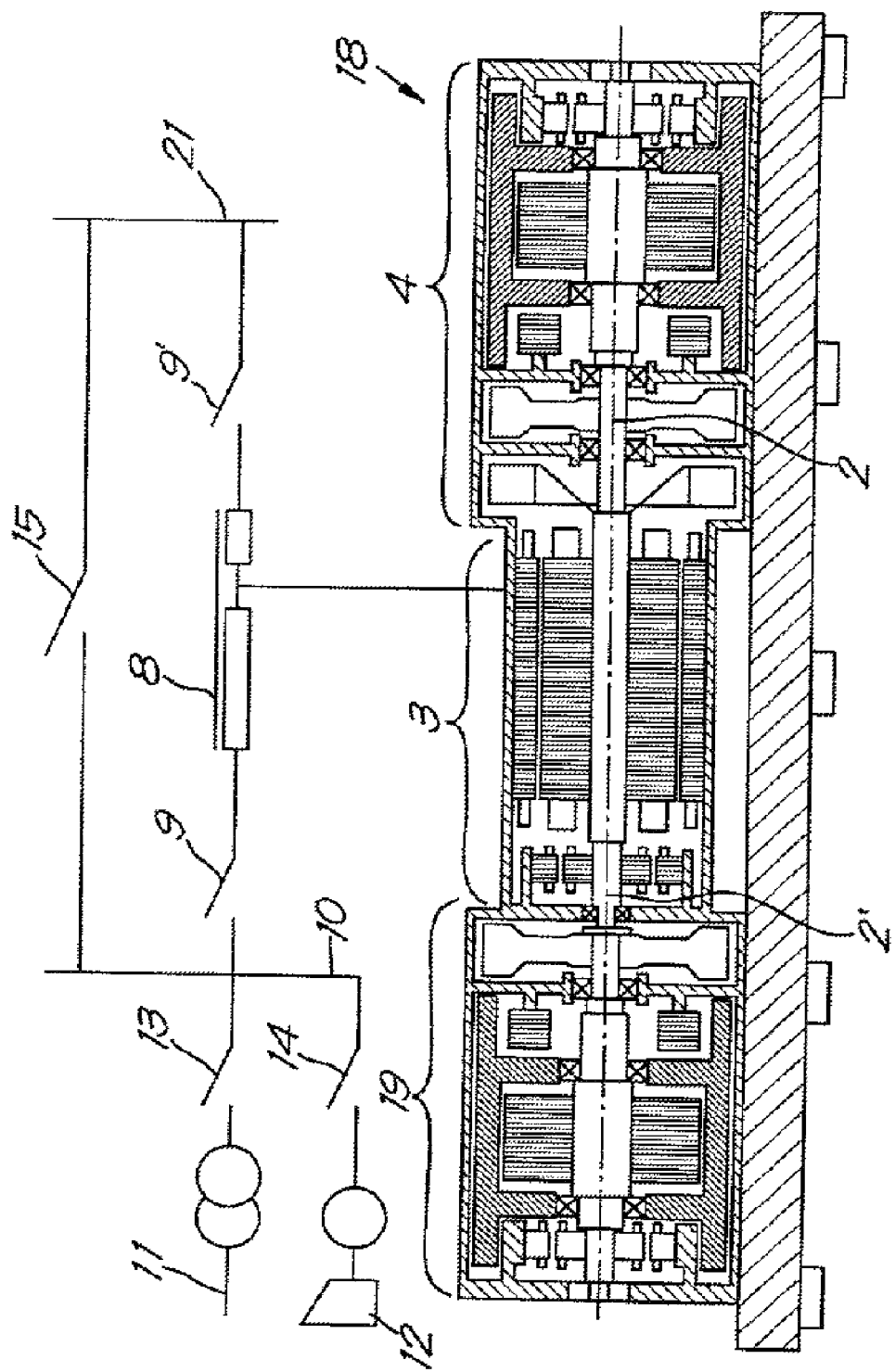
FIG. 5 represents an embodiment where the dynamic uninterruptible power supply system shown in FIG. 4 is equipped with a source inverter.

FIG. 5 shows an embodiment where the dynamic uninterruptible power supply (DUPS) system 18 shown in FIG. 4 is equipped with a source inverter 10. The source inverter 10 selects an electricity source from between the electrical network 11 and an alternative source, for example, an electricity generator unit 12 such as a diesel motor generator, by means of two circuit breakers 13, 14.

Figure 6:
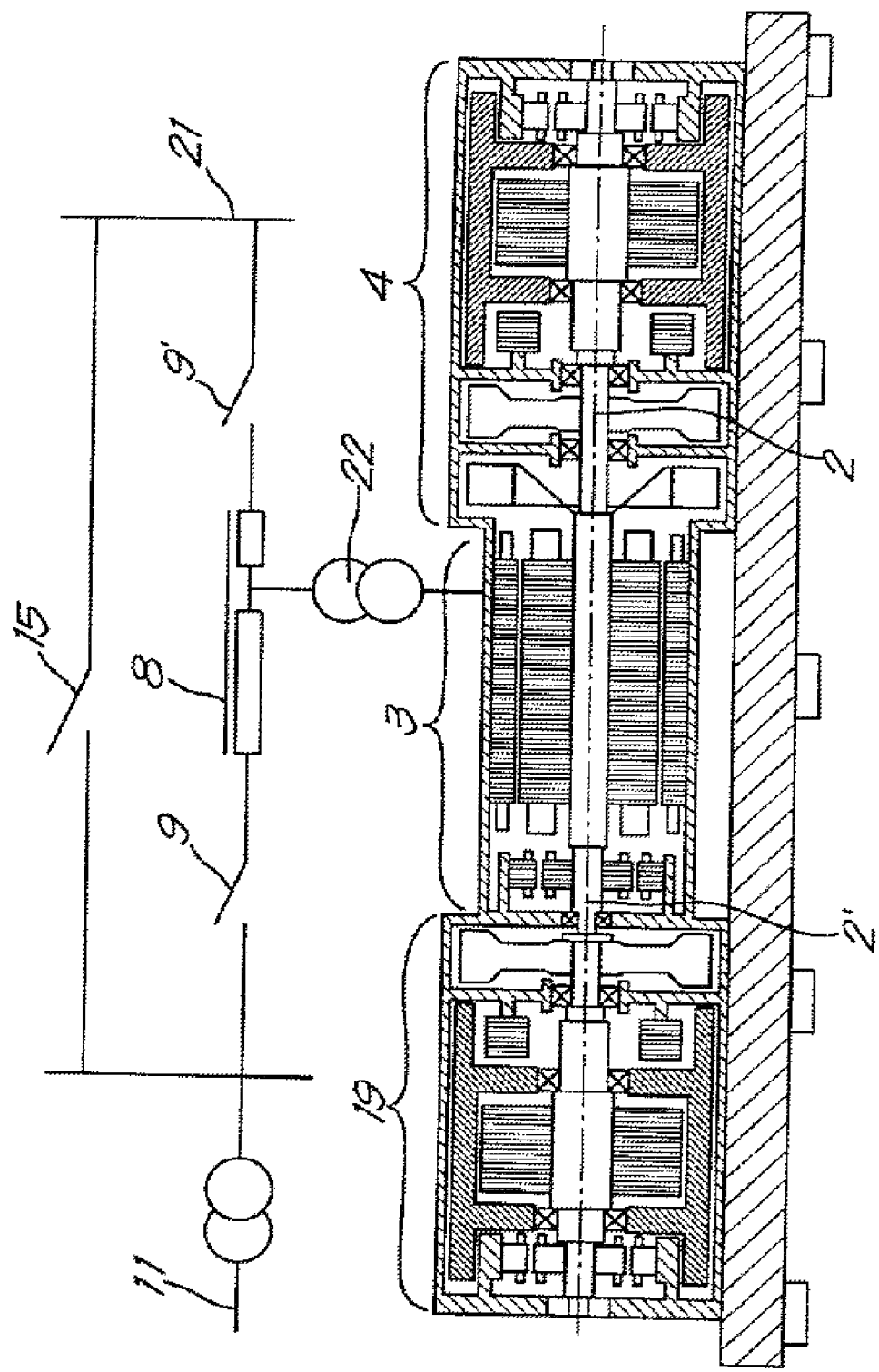
FIG. 6 represents an embodiment where the dynamic uninterruptible power supply system shown in FIG. 4 is equipped with an additional transformer.

FIG. 6 shows an embodiment where the dynamic uninterruptible power supply (DUPS) system 18 shown in FIG. 4 is equipped with a voltage boosting transformer 22 inserted between the synchronous machine 3 and its autonomous connection system 8, 9, 9'.

Figure 7:
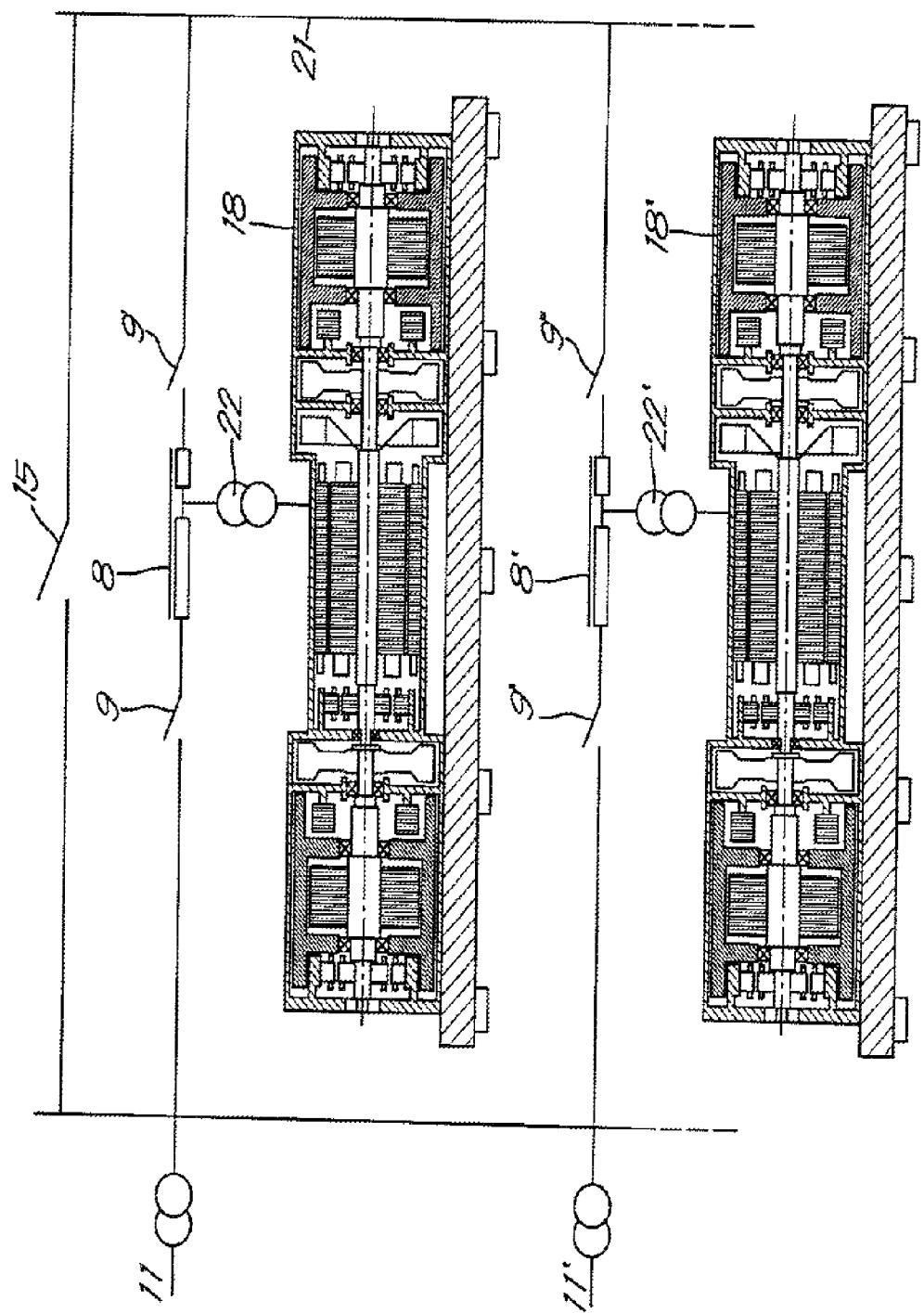
FIG. 7 represents two dynamic uninterruptible power supply systems according to the invention shown in FIG. 6, connected in parallel.

FIG. 7 shows two dynamic uninterruptible power supply (DUPS) systems 18, 18' according to the invention shown in FIG. 6, connected in parallel. The DUPS systems 18, 18' are equipped with transformers 22, 22' connected in parallel to produce greater capacities. The DUPS systems 18, 18' . . . are all linked to the required critical load 21 and are also all linked to one or more sources of electricity, that is, the electrical networks 11, 11'. . .

The operation of the dynamic uninterruptible power supply (DUPS) system 18 according to the invention is simple and can be described as follows with reference to FIG. 5.

When the electrical network 11 provides a stable power supply for a critical load 21, for example, in a hospital, a computer centre, critical data banks, a high technology industry, etc., there is no intervention by the DUPS system 18 according to the invention; the DUPS system 18 ensures that, at all times, the rotating masses 5 in the two kinetic energy accumulators 4, 19 exemplarily illustrated in FIG. 3, rotate at a speed such that sufficient energy is available in the event of an emergency.

When the electrical network 11 is down, the connection between the electrical network 11 and the critical load 21 is automatically interrupted by the autonomous connection system 8, 9, 9' of the synchronous machine 3 by opening the circuit breaker 9. Since the circuit breaker 9' is closed, the synchronous machine 3 spontaneously supplies the critical load 21 by drawing its energy from the two rotating masses 5 of the kinetic energy accumulators 4, 19.

If the disruption is too long, the DUPS system 18 automatically starts up the electricity generator unit 12 by, for example, activating a diesel motor which, once at speed, can replace the electrical network 11 to supply the critical load 21. The autonomous connection system 8, 9, 9' now closes the circuit breaker 14 of the source inverter 10 and closes the circuit breaker 9 such that the electricity generator unit 12 can now supply the critical load 21 without interruption via the autonomous connection system 8, 9, 9', until the electrical network 11 is restored.

Once the electrical network 11 has been re-established, the circuit breaker 13 is automatically closed while the circuit breaker 14 is open, to re-establish supply of the critical load 21 by the electrical network 11 via the autonomous connection system 8, 9, 9'; the electricity generator unit 12 can then be switched off.

The autonomous connection system 8, 9, 9' of the DUPS system 18 provides the necessary power supply from the electricity generator unit 12 to the kinetic energy accumulators 4, 19, to recharge the kinetic energy accumulators 4, 19 in order for the power supply to be available in the event of another failure of the public electrical network 11.

If the DUPS system 18 exemplarily illustrated in FIG. 7, with two kinetic energy accumulators 4, 19 has insufficient power to protect the critical load 21, it is possible to connect two or more of these DUPS systems 18, 18' in parallel, such that the power delivered at the critical load 21 can be adapted to demand.

The invention is not limited to installations described in the examples above and the figures, but it is evident that numerous modifications can be made to the dynamic uninterruptible power supply systems 18, 18' without departing from the scope of the invention as defined in the following claims.

We claim:

1. A dynamic uninterruptible power supply system, comprising:
   a synchronous machine with two shaft ends inserted between two kinetic energy accumulators for doubling unit capacity, said kinetic energy accumulators each comprising a rotating mass, said synchronous machine further comprising:
      an autonomous connection system for exchanging and correcting, in real time, speed of rotation of the rotating masses of the two kinetic energy accumulators.

2. The dynamic uninterruptible power supply system of claim 1, further comprising couplings configured to create a link between shafts of said two kinetic energy accumulators and said synchronous machine.

3. The dynamic uninterruptible power supply system of claim 1, wherein a casing of said synchronous machine is attached at two ends to casings of said two kinetic energy accumulators, and wherein said casings of said two kinetic energy accumulators are mounted on a common frame.

4. The dynamic uninterruptible power supply system of claim 1, wherein said autonomous connection system comprises an inductor and two circuit breakers, wherein a first of said two circuit breakers is configured to interrupt a connection of said synchronous machine with an electrical network, and wherein a second of said two circuit breakers is configured to maintain a connection between said synchronous machine and a critical load to be supplied without interruption.

5. The dynamic uninterruptible power supply system of claim 4, wherein the autonomous connection system exchanges and corrects the speeds of the rotating masses of the two kinetic energy accumulators whenever there is a reduction in speed of any of the rotating masses, and wherein the autonomous connection system brings back the rotating masses of the two kinetic energy accumulators to an identical speed to suitably maintain power distribution between the two kinetic energy accumulators for avoiding premature discharge of either of the two kinetic energy accumulators.

6. The dynamic uninterruptible power supply system of claim 4, further comprising a source inverter configured to switch between said electrical network and a diesel motor generator unit to provide dynamic power with no long lasting interruption.

7. The dynamic uninterruptible power supply system of claim 4, further comprising a voltage boosting transformer inserted between said synchronous machine and said autonomous connection system.

8. The dynamic uninterruptible power supply system of claim 1 connected in parallel to another one or more dynamic uninterruptible power supply systems to achieve greater capacities.

* * * * *